No. 722,897. PATENTED MAR. 17, 1903.
F. RADEMACHER.
APPARATUS FOR BROILING MEAT OR FLESH OF ANIMALS
OR OTHER FOOD STUFFS.
APPLICATION FILED JAN. 9, 1902.
NO MODEL.
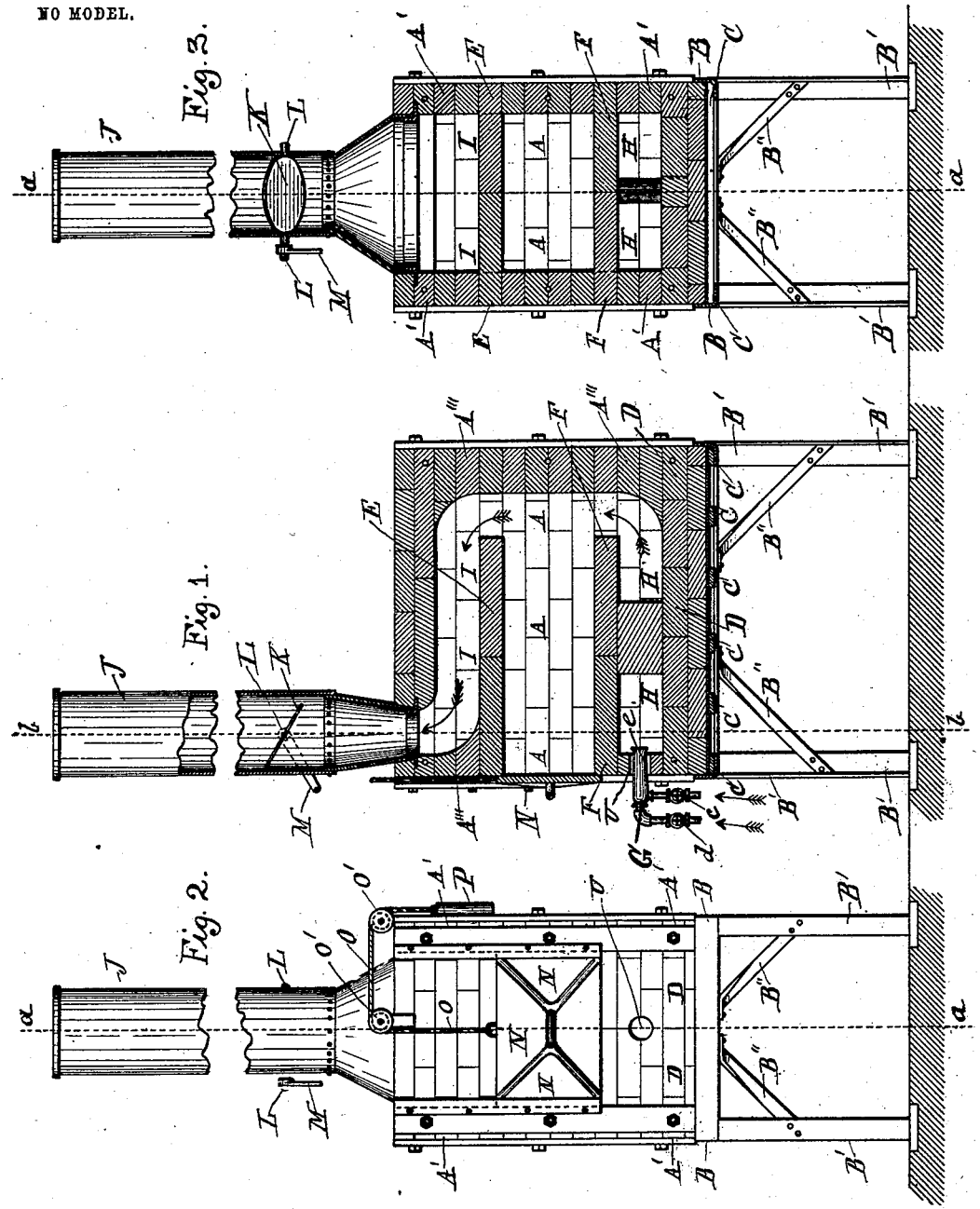
WITNESSES:
William E. Murray
Hadassah Day
INVENTOR
Frank Rademacher
BY St. John Day
ATTORNEY

UNITED STATES PATENT OFFICE.

FRANK RADEMACHER, OF LOS ANGELES, CALIFORNIA, ASSIGNOR OF ONE-HALF TO JOSEPH MAIER AND GEORGE ZOBELEIN, OF LOS ANGELES, CALIFORNIA.

APPARATUS FOR BROILING MEAT OR FLESH OF ANIMALS OR OTHER FOODSTUFFS.

SPECIFICATION forming part of Letters Patent No. 722,897, dated March 17, 1903.

Application filed January 9, 1902. Serial No. 89,083. (No model.)

*To all whom it may concern:*

Be it known that I, FRANK RADEMACHER, chief engineer of the Maier and Zobelein brewery, residing in the city of Los Angeles, in the county of Los Angeles, in the State of California, have invented certain new and Improved Apparatus for Broiling Meat or Flesh of Animals or other Foodstuffs, of which the following is a full, clear, and exact description or specification, reference being had to the annexed sheet of drawings and to the letters marked thereon.

This invention relates to a new or improved apparatus for broiling food; and it is more especially applicable for broiling steaks and other portions of the flesh of animals, with the object of rendering the same very rapidly prepared for use as food without deteriorating or losing the more particularly nutritious parts of the meat or flesh, which parts mostly consist of the more or less liquid or partly-liquid contents of the compact or denser portions of the meat or flesh itself.

I effect the aforesaid object by using the apparatus constituting my invention in such manner that while the meat or flesh is quickly desiccated or dried upon its exterior surfaces by being subjected to an intense heat without the presence of flame or charring influences the meat or flesh is at the same time while placed or held in my apparatus subjected to a rapid draft of atmospheric air over its external surfaces, which causes all moisture of the immediate surfaces of the meat or flesh to be carried off, as well as all of the odors which are given off by meat or flesh undergoing cooking or broiling in cooking apparatus as hitherto constructed and operated.

Upon the annexed drawings, Figure 1 is a longitudinal section of the apparatus constituting my present invention, taken on the line *a a*, Figs. 2 and 3. Fig. 2 is a front elevation thereof. Fig. 3 is a transverse vertical section of the same on the line *b b*, Fig. 1.

In all of the figures the apparatus is shown as consisting of the broiling-chamber A, preferably constructed of fire-brick in the manner hereinafter described and carried upon a stand or frame of angle-iron B, upon which the chamber A and its several parts are built and supported, as follows:

The main horizontal rectangular framing of angle-iron B is supported at its corners by the legs B' and angle-stays B''. This frame B has fastened across the bottom thereof the several plates or strips C C, upon which there is laid non-conducting material—such, for example, as asbestos in any of its suitable natural states, or in its manufactured states of paper, cardboard, or cloth. Upon this layer of asbestos or equivalent non-conducting material there is placed the lowest layer of brick, as shown in the drawings, and upon this again the layer of fire-bricks, (marked D,) which constitutes the bottom of the under flue of the apparatus. From this brickwork bottom the two side walls A' A' and the front and back walls A'' A'' are built upward, as shown, and in the side walls A' A' and front wall A''' there are carried the thick slabs of fire-clay E and F, respectively, as shown at Figs. 1 and 3. These slabs constitute the bottom and the top of the broiling-chamber A, while the side walls C C constitute the sides of the chamber A. From the front of the apparatus and through a hole U in the front brick wall D thereof there is introduced an oil-burner G, which may be any kind of burner suitable for burning mineral oils in a steady continuous flame of high temperature, which flame, together with the heat generated thereby, is spread throughout the bottom flue H (shown in Figs. 1 and 3) and passes from this flue H upward over the inner end of the chamber A, as indicated by the arrows in Fig. 1, into the upper flue I, finally escaping, as also indicated by the arrow in Fig. 1, into the chimney J. The chimney J is provided with a butterfly-damper K, mounted upon a central spindle L, provided at its outer end with a lever M, by which the damper K is operated for regulating the area of draft-passage in the chimney K, as is well understood. The front of the chamber A is provided with a rising and falling door N, which is suspended by the chain O, passing over carrier-pulleys O' from the counterweight P. The door N is opened or closed to any desired extent, as required, for either raising the temperature of the chamber A or for introducing portions of meat or flesh thereinto to be broiled in the manner hereinbefore set forth.

It is to be understood that by reason of the construction and arrangement of the apparatus constituting this invention when the front door N is closed the whole of the heat generated by the combustion of oil and steam issuing from the burner G is utilized (with the exception of what escapes into the chimney J) for heating the chamber A to the requisite high temperature, and when this high temperature is reached then the door N is raised to any desired extent and any portion or portions of meat or flesh which are to be broiled or treated in my apparatus in the manner and for the purposes hereinbefore described are then either held in the chamber A by hand broiling-tongs, as is well understood, or hooks may be provided for suspending the portions of meat or flesh within the chamber A, wherein the outer surface is so rapidly desiccated or dried, thereby closing the outer pores of the meat and retaining the nutrition thereby prevented from escaping from the meat or flesh so treated, that the entire broiling or cooking portion is reduced with medium-sized pieces of meat or flesh to a period of forty to fifty seconds of time, or thereabout.

During the broiling or cooking operation any odors which may escape from the meat or flesh being treated in the chamber A escape, with the flame and products of combustion of the oil and steam issuing from the burner C, into the chimney J, and thus the operation of broiling or cooking meat or flesh or other food-stuffs is carried on without the production of offensive smells or odors in the apartments wherein the said cooking apparatus is contained.

The burner G (shown at Fig. 1 of the drawings) is a burner of a kind well understood and in general use, consisting, as it does, of a pipe and valve c, leading to an oil-tank, and another pipe and valve d, connected with a steam-generator, the action of the steam upon the oil causing the two to be mixed in an inflammable mixture and to issue as flame from the discharge-nozzle e of the burner.

Having now described the nature of my said invention and the best system, mode, or manner I am at present acquainted with for carrying the same into practical effect, I desire to observe in conclusion that what I consider to be novel and original, and therefore claim as the invention to be secured to me by Letters Patent, is as follows:

The apparatus consisting of the broiling-chamber, the flue beneath the closed bottom and above the closed top of the broiling-chamber, these top and bottom flues being connected by a vertical passage at the open inner ends of the broiling-chamber and the burner in the bottom flue all operating in the manner and for the purposes substantially as set forth.

In testimony whereof I have hereunto set my hand, in the presence of two subscribing witnesses, this 9th day of December, 1901.

FRANK RADEMACHER.

Witnesses:
 ST. JOHN DAY,
 HADASSAH DAY.